Inventor
VICTOR E. RIMSHA
ROBERT R. DAHL

Dec. 3, 1957 V. E. RIMSHA ET AL 2,815,041
SINGLE SOLENOID HYDRAULIC CONTROL VALVE
Filed Nov. 22, 1955 2 Sheets-Sheet 2
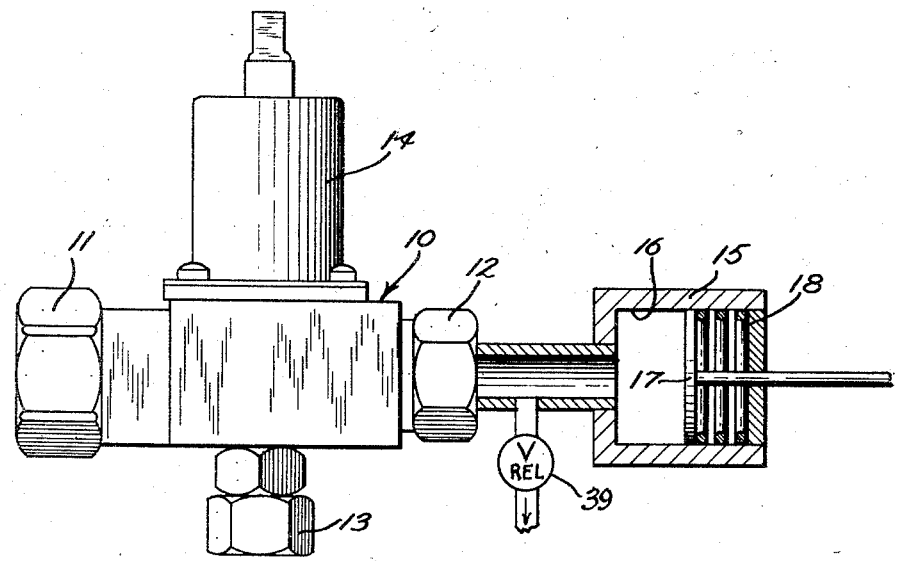
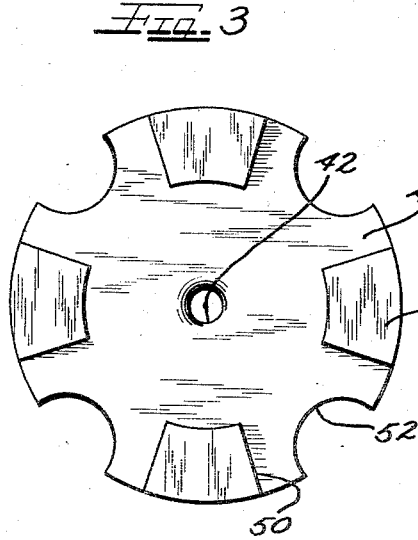
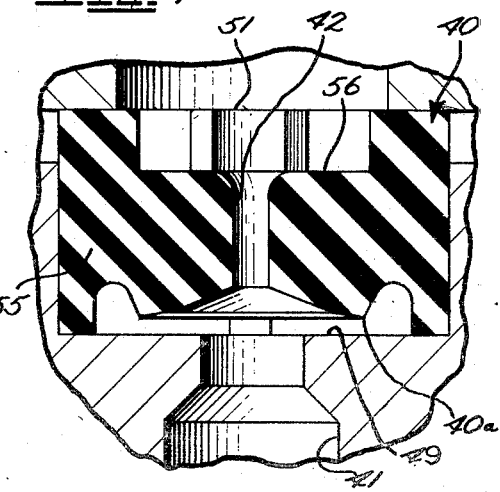
Inventor
VICTOR E. RIMSHA
ROBERT R. DAHL

United States Patent Office 2,815,041
Patented Dec. 3, 1957

2,815,041

SINGLE SOLENOID HYDRAULIC CONTROL VALVE

Victor E. Rimsha and Robert R. Dahl, Chicago, Ill., assignors to The Dole Valve Company, Chicago, Ill., a corporation of Illinois Application November 22, 1955, Serial No. 548,442

5 Claims. (Cl. 137—620)

This invention relates to a flow control apparatus and to a fluid pressure operated actuating assembly.

It is an important object of the present invention to provide a novel flow control apparatus for controlling the power and return strokes of a fluid actuated mechanism.

It is a further object of the present invention to provide a particularly economical and simple flow control apparatus.

Still a further object of the present invention is to provide a novel fluid pressure operated actuating system having a relatively constant rate of movement in the power stroke and a rapid return stroke.

In accordance with one embodiment of the invention, there is provided a flow control apparatus having an inlet passage, an outlet passage and a discharge passage wherein a flow control member is utilized in the outlet passage to control flow to an output device such as a hydraulic cylinder and piston assembly, and wherein a by-pass type flow control member is utilized in the discharge passage to substantially limit flow therethrough under high pressure conditions during actuation of said cylinder. The outlet flow control member affords substantially free flow of fluid from the hydraulic cylinder on the return stroke of the piston, and the discharge by-pass flow control member affords relatively free flow under low pressure conditions such as are present during the return stroke of the cylinder.

Other objects, features and advantages of the present invention will become apparent from the following detailed description taken in connection with the accompanying drawings, in which:

Figure 2 is a part elevational and part sectional view of an actuating system in accordance with an embodiment of the present invention;

Figure 3 is a top plan view illustrating the construction of the by-pass type flow control washer shown in Figure 1; and Figure 4 is a cross sectional view showing the washer of Figure 3.

As shown on the drawings:

Figure 1:
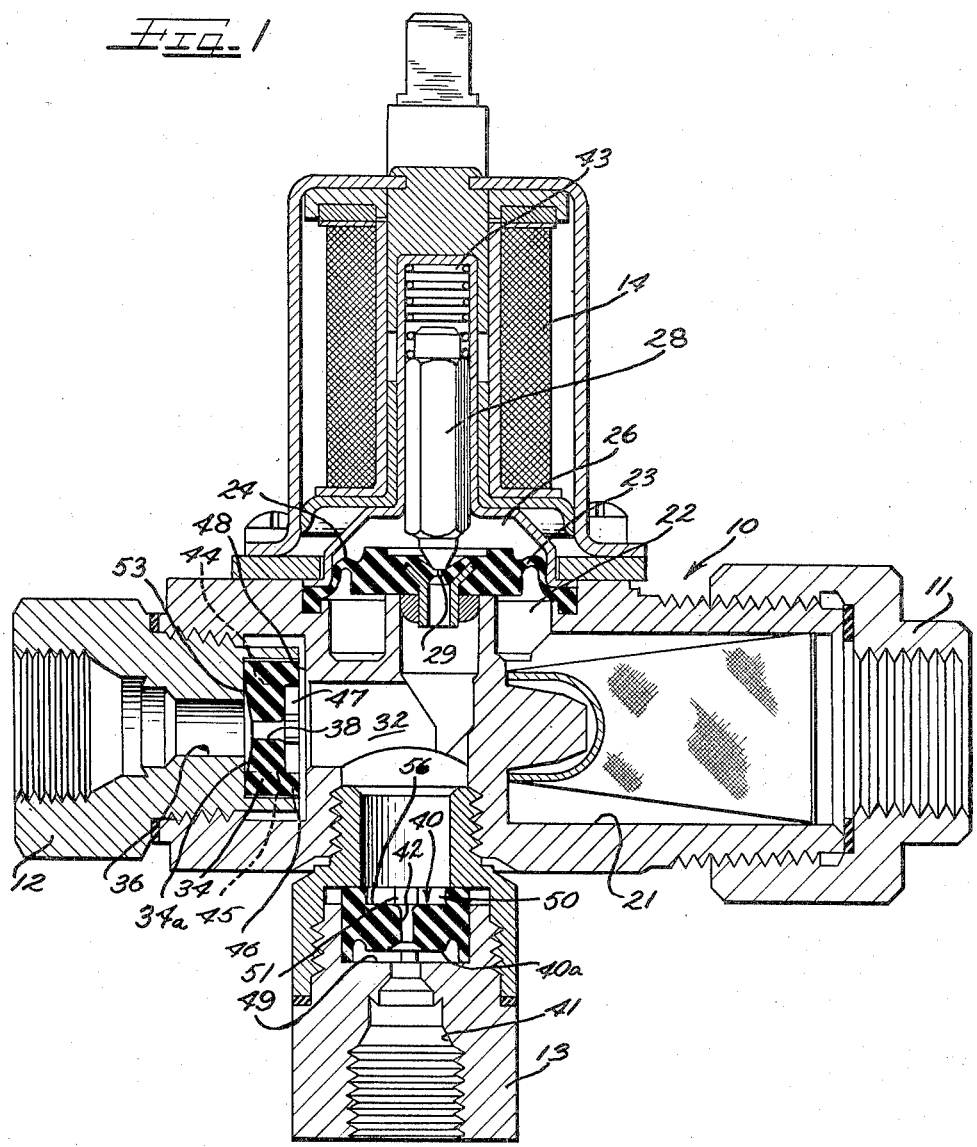
Figure 1 is a vertical sectional view of a solenoid operated flow control apparatus constituting an embodiment of the present invention.

Referring to Figures 1 and 2, the reference numeral 10 designates a flow controlling apparatus having an inlet fitting 11, and outlet fitting 12, and a discharge fitting 13. Fluid is introduced under pressure into the inlet 11 under the control of a solenoid 14 and is delivered to a cylinder 15, Figure 2, having an actuating chamber 16 for causing the piston 17 to execute a power stroke against the bias of the compression spring 18. When it is desired to return the piston 17 to initial condition, the solenoid 14 is actuated and the actuating chamber 16 is exhausted through the discharge fitting 13.

As illustrated in Figure 1, the flow control apparatus may include an inlet passage 21 leading to an annular inlet chamber 22 which communicates by means of bleed passages such as 23 through a diaphragm valve 24 with a diaphragm chamber 26. When solenoid 14 is energized to retract the armature 28 and open the diaphragm port 29, pressure in the diaphragm chamber 26 is relieved to allow the diaphragm valve 24 to move to open position affording communication between the inlet chamber 22 and the central chamber 32 of the valve. Fluid flows from the central chamber 32 through a flow control washer 34 to an outlet passage 36 which may as indicated in Figure 2 lead to an actuating chamber such as 16 of a hydraulically actuated device. The flow control washer 34 may be of the type which maintains flow therethrough at a uniform rate; in the present case for example flow might be .3 gallons per minute. As pressure in the central chamber 32 increases, the upstream side of passage 38 through the washer tends to restrict to maintain the constant flow. Under high pressure conditions, by-pass washer 40 in the discharge passage 41 restricts flow through the aperture 42, and for example may restrict flow to ⅛ gallon per minute for a pressure in the chamber 32 of approximately 15 lbs. per square inch.

A pressure regulating valve 39 may be provided as indicated in Figure 2 if it is desired that the pressure in actuating chamber 16 shall not exceed a predetermined value.

If now, it is desired to return the pressure actuated device such as piston 17 to initial condition, the solenoid 14 is deenergized whereupon a compression spring 43 urges the valve member 28 downwardly into restricting relation to the diaphragm port 29. Under these conditions, pressure builds up in the diaphragm chamber 26 causing the diaphragm valve 24 to move to closed position to interrupt supply of fluid from the inlet 21 to chamber 32. When a small amount of fluid has drained from the chamber 32 through the flow control passage 42, pressure in the chamber 32 drops to the value produced by the force of spring 18, and washer 34 shifts axially until lugs 46 thereof abut shoulder 48 to allow by-pass of fluid from outlet 36 through ports formed by grooves along the periphery of washer 34 such as indicated at 44 and 45 which open intermediate lugs 46 at the upstream side of washer 34, between adjacent lugs 46 to chamber 32. Under low pressure conditions, washer 40 assumes the condition shown in Figures 1 and 4, with annular lip 40a off its seat 49 to allow flow of fluid from chamber 32 through openings 50 between lugs 51 and along grooves 52 to discharge passage 41. Discharge passage 41 may be connected to a suitable drain or sump or the like. For example, the characteristics of the flow control washer 40 may be such as to allow by-pass from grooves 52 past lip 40a to discharge passage 41 when the pressure in the chamber 32 drops below 10 lbs. per square inch. Washer 34 is so constructed as to maintain ports 44 and 45 closed by seating of the downstream annular surface portion 34a of the washer 34 against the adjacent shoulder 53 while fluid is being supplied to outlet 12.

As illustrated in Figure 4, specifically, the flow washer 40 may comprise an annular ring of resilient material 55 and may include an annular lip 40a which in unstressed condition of the member 55 is held above the shoulder 49, but upon increase in pressure at the upstream side 56 of the member is pressed against the shoulder to seal off the passages such as indicated at 52. At the same time, it will be understood that the upstream portion of the central passage 42 through the washer tends to constrict to tend to maintain a constant flow through the washer with increasing pressure once the pressure has exceeded the value where by-pass is permitted.

Operation

When the solenoid 14 is actuated, valve member 28 is retracted to allow the diaphragm valve 24 to open to deliver fluid through the flow control washer 34 to the actuating chamber 16 of the pressure actuated device 15. A small amount of fluid bleeds through the flow control washer 40 under these conditions.

When the solenoid 14 is deenergized, valve member 28 moves to closed position to cause the diaphragm valve 24 to close, whereupon fluid is freely exhausted from the actuating chamber 16 through by-pass passages such as 44 of the flow control 34 and through by-pass passages 52, Figure 3, of the flow control 40. Thus the single solenoid is operative to control both the power and return strokes of the pressure actuated mechanism 15.

It will be apparent that many modifications and variations may be effected without departing from the scope of the novel concepts of the present invention.

We claim as our invention:

1. In a flow control apparatus, means defining a chamber, inlet means for delivering fluid to said chamber, outlet means communicating with said chamber, discharge means communicating with said chamber, outlet flow control means between said chamber and said outlet means for maintaining a relatively uniform rate of flow from said inlet means to said chamber and through said outlet flow control means to said outlet means, discharge flow control means interposed between said chamber and said discharge means for substantially restricting flow from said inlet means to said discharge means, said outlet flow control means accommodating relatively free flow of fluid from said outlet means to said chamber, and said discharge flow control means being responsive to reduced pressure in said chamber to accommodate relatively free flow of fluid from said chamber to said discharge means when supply of fluid from said inlet means is restricted.

2. In a flow control apparatus, means defining a chamber, inlet means for supplying fluid to said chamber, valve means interposed between said inlet means and said chamber for controlling communication therebetween, outlet means communicating with said chamber separately from said inlet means, discharge means communicating with said chamber separately from said inlet means and said outlet means, means restricting flow from said inlet means to said discharge means when said valve means is in relatively open condition, and a flow control washer interposed between said chamber and said outlet means and operative with said valve means in relatively open relation to maintain a substantially uniform rate of flow from said inlet means to said outlet means, and operative in response to pressure in said outlet means exceeding pressure in said chamber to accommodate relatively free flow from said outlet means to said chamber, said discharge flow restricting means accommodating relatively free flow from said chamber to said discharge means when said valve means is in relatively restricting condition.

3. In a flow control apparatus, means defining a chamber, inlet means for delivering fluid to said chamber, valve means controlling flow between said inlet means and said chamber, outlet means communicating with said chamber separately from said inlet means, discharge means communicating with said chamber separately from said outlet means, an outlet flow control washer interposed between said chamber and said outlet means and operative to maintain a relatively uniform rate of flow from said inlet means to said outlet means when said valve means is in relatively open condition, and operative to accommodate relatively free flow from said outlet means to said chamber when said valve is in relatively restricting condition, and a discharge flow control washer interposed between said chamber and said discharge means and responsive to a relatively high pressure in said chamber when said valve means is in relatively open condition to restrict flow to said discharge means from said chamber and operative in response to a relatively low pressure in said chamber when said valve means is in restricting condition to accommodate relatively free flow from said chamber to said discharge means.

4. In a flow control apparatus, inlet means for accommodating a supply of fluid therethrough, outlet means for communication with said inlet means, discharge means for communication with said outlet means upstream of said outlet means in the path of flow from said inlet means to said outlet means, outlet flow control means upstream of said outlet means and downstream of said communication of said discharge means with the path of flow from said inlet means to said outlet means, said outlet flow control means being deformable in response to increasing pressure at the upstream side thereof with respect to the path of flow from said inlet means to said outlet means to progressively restrict flow therethrough, and having by-pass passages associated therewith which are closed in response to relatively high pressure on said upstream side thereof but which are opened in response to pressure on the opposite side thereof exceeding said pressure on said upstream side thereof, and means accommodating relatively unrestricted flow from said outlet means to said discharge means in response to relatively reduced pressure on said upstream side of said outlet flow control means, but responsive to relatively increased pressure on said upstream side of said outlet flow control means to restrict flow from said inlet means to said discharge means.

5. In a flow control apparatus, inlet means for supplying fluid therethrough, outlet means for communication with said inlet means, solenoid operated valve means controlling flow from said inlet means to said outlet means, outlet flow control means in the flow path from said inlet means to said outlet means downstream of said solenoid operated valve means, discharge means communicating with said flow path from said inlet means to said outlet means downstream of said valve means and upstream of said outlet flow control means, means defining a by-pass passage around said discharge flow control means, said discharge flow control means being deformable in response to a relatively high pressure upstream of said outlet flow control means to restrict said by-pass passage, and said outlet and discharge flow control means being operative upon restriction of said solenoid operated valve means to accommodate discharge of fluid from said outlet means to said discharge means and through said by-pass passage.

References Cited in the file of this patent

UNITED STATES PATENTS

| | | |
|---|---|---|
| 2,021,580 | Osgood | Nov. 19, 1935 |
| 2,548,651 | Chace | Apr. 10, 1951 |
| 2,646,059 | Wittner | July 21, 1953 |
| 2,728,355 | Dahl | Dec. 27, 1955 |